June 30, 1936.  H. H. BURTON  2,045,978
LOOM
Filed Sept. 16, 1933  3 Sheets-Sheet 1

Harry H Burton  INVENTOR
BY
Hazard+Neary  ATTORNEYS

June 30, 1936.  H. H. BURTON  2,045,978
LOOM
Filed Sept. 16, 1933   3 Sheets-Sheet 2
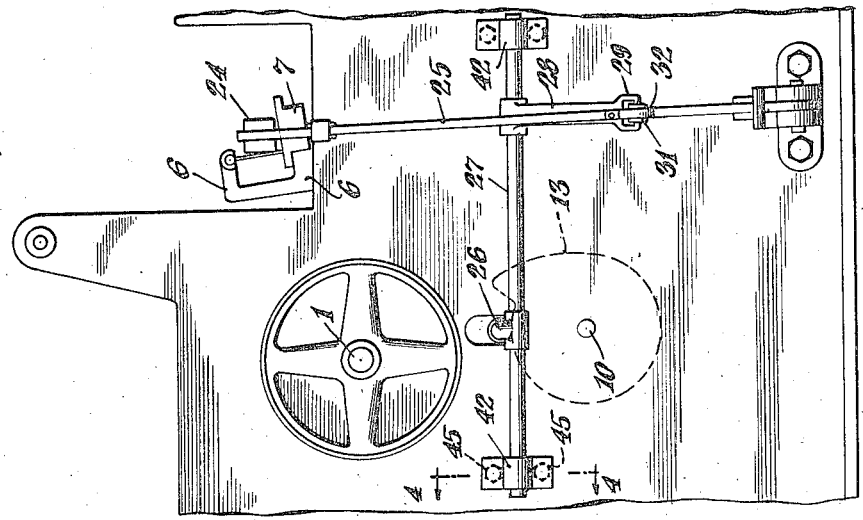
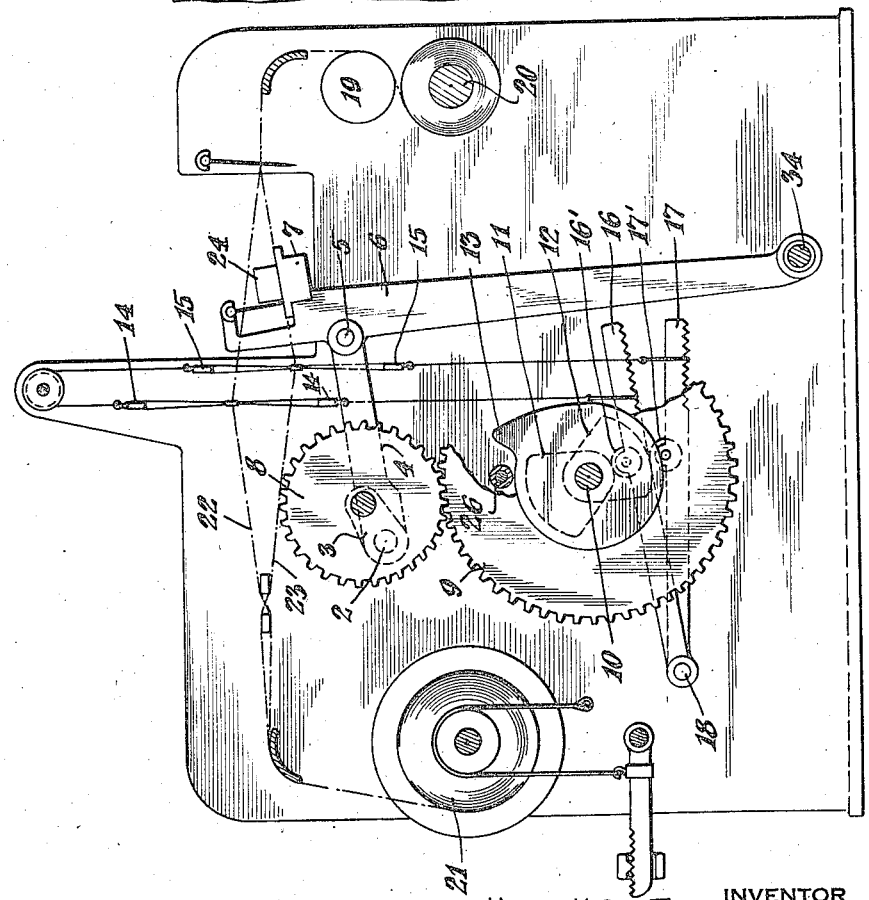
Harry H Burton  INVENTOR
BY
Haguet & Neary  ATTORNEYS

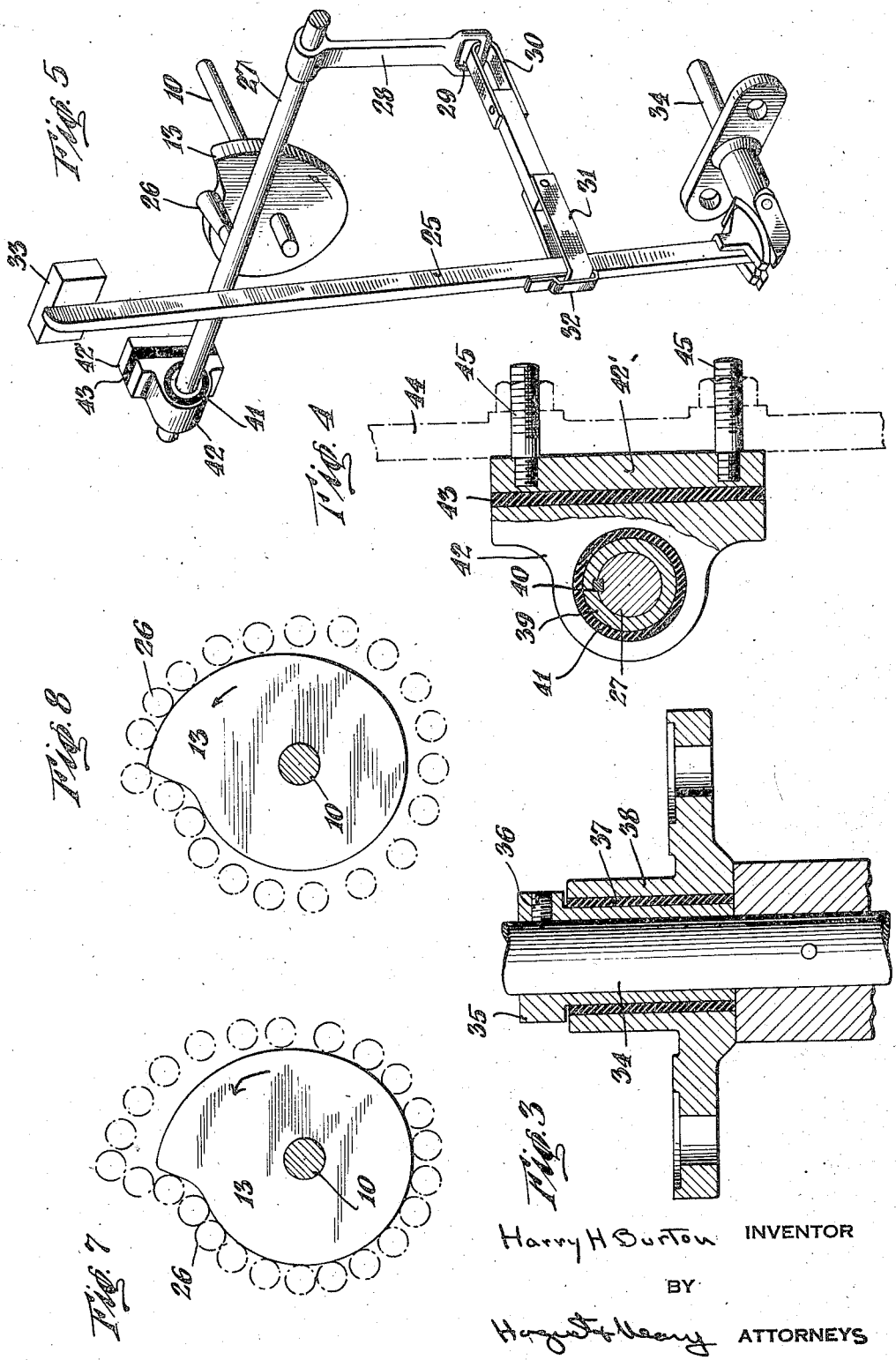

Patented June 30, 1936

2,045,978

UNITED STATES PATENT OFFICE 2,045,978

LOOM

Harry H. Burton, Webster, Mass., assignor to Slater Mills, Inc., Webster, Mass., a corporation of Massachusetts Application September 16, 1933, Serial No. 689,767

12 Claims. (Cl. 139—142)

This invention relates in general to improvements in textile machinery, more particularly looms, and has for one of its objects the provision of an improved system of driving such machinery having shock absorbing means for eliminating the transmission of vibrations throughout the machinery so as to permit the production of fabrics of uniform weave, free from imperfections resulting from unequal beating and from staining.

The conventional practice has been to employ ordinary metal bearings throughout textile machines such as looms which necessitate lubrication and which have a tendency to wear and develop play with the resulting vibration. This wearing of the metal bearings in looms develops rapidly in certain of the more important main bearings which are difficult and dangerous to lubricate, due to their position behind the other moving parts of the loom. This wear develops play in the lay and back lash in the gear tram and as the vibration results therefrom the precision of operation of the take-up roll is materially affected, resulting in the uneven placement of the filler threads in the fabric.

Due to the many moving parts and the rapidity and nature of movement thereof, there are many sources of vibration or shock in the operation of a loom when ordinary metal bearings are employed. It is therefore an object of this invention to provide such bearings which will substantially eliminate these sources of vibration and shock and so that the take-up roll will function with the utmost precision, with this end in view, it is proposed to substitute for the ordinary metal bearings a series of resilient bearings which may take the form of rubber members to absorb the shock between the moving parts and the stationary frame of the loom and also between relatively movable operating parts for absorbing direct thrusts and re-transference of energy to the moving parts so that the precision of operation of the take up roll will not be adversely affected.

With the foregoing and other objects in view, the invention consists in the combination of parts and in the details of construction hereinafter set forth in the following specification and appended claims, certain embodiments thereof being illustrated in the accompanying drawings, in which:

Figure 2 is a view in sectional outline, taken along line 2—2 of Figure 1;

Figure 3 is a detail view of a longitudinal section taken through the rocker shaft bearing;

Figure 4 is a detail view of a section taken through one of the picker shaft bearings and its attachment to the frame of the loom;

Figure 5 is a view in perspective of the picker shaft and operating cam;

Figure 6 is a view in side elevation of the general assembly shown in Figure 5;

Figure 7 is a diagrammatical illustration of the action of the picker ball on the operating cam in the conventional type of loom;

Figure 8 is a similar illustration of the action of the picker ball on the operating cam in the improved type of loom of this invention.

Figure 1:
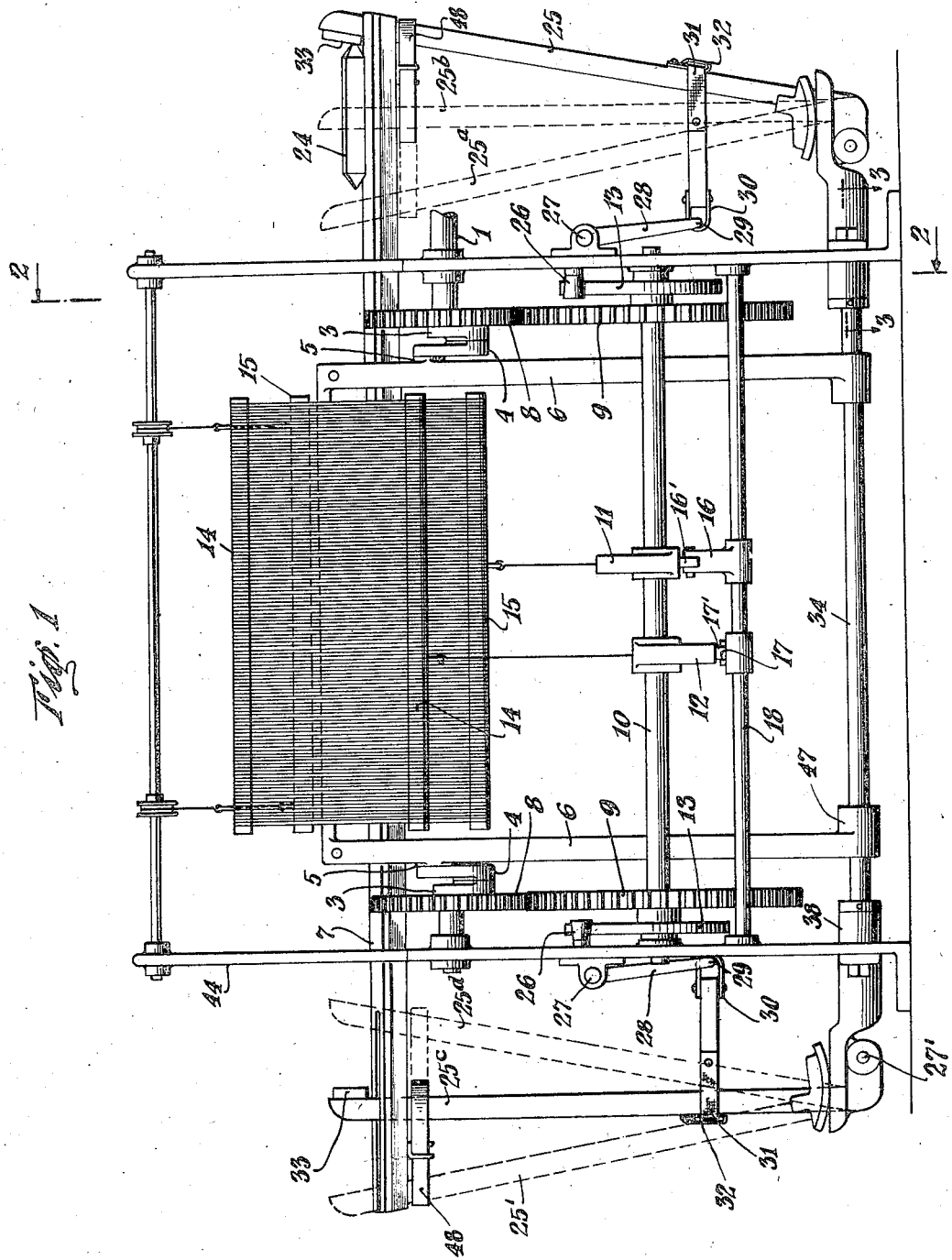
Figure 1 is a view in side elevation of the essential parts of a loom and showing in dotted lines the various positions assumed by the picker stick.

Referring more particularly to the drawings, the motion is communicated to all of the working parts from a main shaft 1, upon which a pair of cranks 3 positioned at each side of the loom are connected and which latter, in turn, are pivotally connected at 2 to links 4. The links 4 are pivotally connected at 5 to the swords 6, which in turn operate to oscillate the lay 7. The main shaft also carries a gear 8 adapted to mesh with a larger gear 9 so as to drive a second shaft 10 at half its own speed.

Fixedly carried by shaft 10 are a pair of cams 11 and 12 for moving the healds 14 and 15 up and down through the medium of treadles 16 and 17 and about a common pivot 18. This is brought about by the provision of a roller 16' on treadle 16 bearing on the face of cam 11 and a roller 17' on the treadle 17 bearing on the face of the cam 12. Also operated by the shaft 10 are the pair of pick cams 13 for moving mechanisms, causing the shuttle to pass back and forth.

As is usual practice, the cloth may be drawn forward regularly over the take-up roll 19 and accumulated on the storage roll 20. The warp beam is indicate at 21 and the warp threads are shown by the dotted lines 22 and 23.

For the simplest form of operation the healds 14 and 15 intermittently draw up one set of warp threads and alternately pull down adjacent ones so as to allow for the insertion of the weft threads by means of the travel across the loom of the shuttle 24 at each change of position of the warp threads. The inserted weft threads are then packed together by the operation of the lay.

Referring to Figure 1, the shuttle 24 is shown boxed on the right hand side adjacent the picker stick 25. The rotary motion of the shaft 10 causes the rotation of cams 13 which are eccentrically mounted thereon. Pick balls 26 are adapted to have bearing on the peripheral face of each cam 13 for imparting rotative motion to the shaft 27. Affixed also to the shaft 27 is an arm 28 which swings when the shaft 27 is rotated. This arm 28 is provided with a loop 29 to receive a strap 30, which is connected to similar strap 31, suitably fixed to each of the picker sticks 25 and 25' by means of any connection 32.

It will be seen by reference to diagrammatic Figure 8 that the pick ball 26 rides on the cam 13 which is rotating in a counterclockwise direction. When the pick ball reaches the high spot of the cam it is raised upwardly, which causes a rotation of the shaft 27 and a movement of the arm 28 around shaft 27 as a pivot. Finally this movement is transferred to the picker stick 25 by means of the straps or belts 31 and its connections 31 and 32 to the arm 28 and picker stick. The movement imparted to the picker stick is sudden, with the result that it gives the shuttle 24 in the adjacent box a blow which sends it across the loom. This operation, of course, carries the weft thread between the warps held spaced by the healds.

It will be noted that in the operation of a loom, the several movements are primarily oscillatory and thus the amount of vibration, strain and jar is greater than would normally be present in a machine having smooth rotative motions. Furthermore, in a loom the problem of vibration and jar is particularly great inasmuch as certain of the oscillatory movements are used to impart a sudden force or blow to other loom parts. Such blows are, for example, present in the operation of the metal cams 13 against the metal pick ball 26 and in the blow of the picker sticks 25 and 25' against the shuttle 24. Ordinarily, the vibrations from any part of the loom are transferred to the entire loom by travelling along one of the metal parts through the metal bearing into the frame. Attempts have been made to diminish, if possible, the vibration and jarring present in the loom by using wood in certain of the members. This method has been far from satisfactory. The main sources of such vibration and shock in the operation of the loom are, for example, the operation of the sword and the lay in the beating-up operation, the operation of the pick ball on the pick cam, the blow of the picker on the shuttle, the picker stick hitting the lay end buffer, the boxing of the shuttle at the end of its travel across the lay, and the pick shaft lug hitting the loom side when the pick ball is thrown up by the picking point of the pick cam. There are, of course, other minor sources of vibration, such as from the gears and driving mechanisms.

In order to eliminate vibrations due to the operation of the sword 6, there is provided on the rocker shaft a rocker shaft box 38 having a resilient bearing. The sword 6 carries a collar 47 by which it is fixed to the rocker shaft 34 with which it turns. This bearing consists of a sleeve 35 surrounding the rocker shaft 34 and affixed thereto at 36, so as to be rotatable with the unit. The rocker shaft box has a sleeve 38 which incloses the sleeve 35. Placed between the sleeves 35 and 38, and completely filling the intermediate circular space, there is a rubber bearing 37. The vibrations and shocks present in the loom are normally transmitted to the take-up roll 19 from the lay 7 and sword 6, as well as from the picker stick, through a metal rocker shaft bearing to the frame of the loom. The presence of the rubber bearing member 37 between the sleeves 35 and 38 making up the rocker shaft bearing has been found to effectively absorb substantially all of the vibrations and shocks which are directly transferred to it by the operation of the loom in general and by the main driving shaft. They also prevent the retransference of energy of the shock from the lay as the reed on the lay strikes the fell of the cloth in the beating-up process. It has been found that when ordinary metal bearings are used for the rocker shaft, especially when not properly lubricated, they wear very quickly and introduce a play. This play causes an eccentric movement of the sword which is fatal to the proper functioning thereof. In actual practice a play of one-eighth of an inch, which would not be uncommon under the above circumstances, would render the parts unfit for use. The substitution of the resilient bearings virtually eliminates this very serious disadvantage.

The rubber member 37 may be either tightly compressed between or vulcanized to one or both of the two sleeves 35 and 38 so that a relative movement therebetween is resisted by the flexing of the rubber. Thus, besides absorbing shock and vibration and preventing wear and consequent play, this resilient bearing also assists in the proper functioning of the sword and the parts operated thereby. The rocker shaft bearing 37, in being so arranged that it will resist a relative movement between the sleeves 35 to 38, makes it possible to provide a neutral point which is preferably in half-way position. The loom thus will have a tendency to stop, with the cranks driving the lay in either top or bottom center. Usually, the stopping of a loom and then starting up again will cause an imperfection to appear in the cloth web. This is due to uneven spacing of the filler threads resulting from lack of full drive on the first beating operation. However, when the loom, having resilient bearing 37, is stopped, the resilient force in the rubber bearing rocking member will tend to aid the first drive of the lay in starting up until it has obtained momentum. Thus the spanning of filler threads, due usually to the lack of necessary beating-up, is avoided. Moreover, by reason of the resilient bearing 41 which brings about the storing up of energy in the picker stick as it is moved in either direction from neutral position, the shuttle may be much more easily boxed and there is eliminated the necessity of picking out of a tight box.

In order to eliminate vibrations due to the operation of the picker stick in actuating the shuttle and the operation of the pick ball shaft by its operating cam, and further, in order to eliminate the transference of such shocks to the loom frame and thence to take-up roll 19, there is provided between the pick ball shaft 27 and the loom frames 44 a bearing consisting of a metallic sleeve 39. This sleeve is keyed at 40 to the shaft 27. An outer bearing bracket 42 incloses the inner sleeve 39. Between the outer bearing bracket 42 and the inner sleeve 39 there is placed a resilient bearing 41, preferably of rubber, which may be tightly compressed between or vulcanized to the sleeve 39 and a bracket 42. This resilient bearing eliminates substantially all of the shocks and vibrations caused by the striking of the shuttle 24 by the picker sticks 25 and 25' and the contact between the pick ball 26 and the operating cam 13, whereas the resilient bearing 37 has for its purpose the absorbing of shocks or vibration caused by the operation of the sword against the lay end buffer.

As a further precaution against the transference of shocks to the loom frame, an additional resilient member 43, which may be of rubber, is placed between the bracket 42 and a plate 42'. The latter is secured to the loom frame 44 by means of bolts and nuts indicated at 45. This rubber shock absorbing member 43 may be vulcanized or otherwise affixed in the positions shown in Figures 4 and 5.

Referring more particularly to Figure 1, the use of rubber bearings of the kind described in connection with the picker stick makes it possible to set the picker shaft 27 in a neutral point in the bearing, so that deflection one way or the other into the positions shown in dotted lines is accomplished against the resistance of elasticity of the rubber bearing in the mountings. The mounting of such bearings can easily be accomplished in such a way that the neutral point comes in the position to give the greatest advantage. For example, in the case of a picker shaft bearing, it is preferably positioned in the mounting 42, so that the neutral point of the stick 25 comes half-way between the two end positions of the stick. The two end positions of the picker stick correspond to those shown at 25 in full lines and 25' in dotted lines, and the intermediate neutral point corresponds to that shown in the dotted lines of the picker stick at 25b and in full lines at 25c. As the shuttle is boxed, the picker stick 25 has been forced from the position shown in dotted lines at 25b to the position shown in full lines at 25. Inasmuch as the movement of the shuttle is decelerated by reason of the resiliency of the picker shaft rubber bearing 41, the hammer blow of the shuttle against the picker stick and box is materially lessened. Also, this same movement stores up energy in the rubber bearing 41, making the next picking operation an easier one, for in addition to the movement given to the picker stick by the pick ball, there is the added tendency to swing back to normal position, due to the resilient bearing 41. This makes for a considerable saving of power for several reasons. In view of the braking effect upon the shuttle thus present in my loom, it is unnecessary to have the shuttle box grip the shuttle as tightly, to stop its motion. From this it will appear, that less power will be needed to drive the shuttle from the shuttle box as it is not necessary to pick out from a tight box. The energy stored in the rubber bearing, when the picker stick is moved to its outermost position by the shuttle, supplements the drive of the picker shaft. The resilient bearing also materially eases up on the throw of the picker stick and prevents it from being worn or broken by hitting against the lay end buffer.

In the operation of looms equipped with the ordinary metal bearings, it has been found that the pick ball, after being lifted to its high point by the cam, is further thrown out by the cam so that it is no longer in engagement therewith. The cam continues this rotation and the pick ball drops back onto its surface beyond the point of maximum lift of the cam. This re-contacting of the pick ball and the cam causes a jarring action, and furthermore tends to dent the surface of the cam. In order to avoid the denting and breaking of the cam surface, it has been customary practice previously to harden the surface of the cam adjacent this point of re-engagement, by case hardening or other means. In certain cases it has been found that the pick ball has been thrown out of engagement with the cam surface to such an extent that it bangs against the frame of the loom adjacent to the cam. This also causes a jarring of the loom with a further setting up of vibration. I have shown by the diagrammatic Figure 7 an approximation of the relative positions of the pick ball with relation to the cam in the ordinary type of loom not equipped with my resilient bearings. It can also be seen from this figure that during the major portion of the travel of the cam, excepting where the pick ball is swung away from the cam, it is in engagement with the usual friction which is involved by such engagement.

In my loom structure making use of the resilient bearings 41 on the pick ball shaft 27, the pick ball is normally held in engagement with the periphery of the cam over that portion of its surface in which it is lifting the pick ball. This period of engagement takes place when the shuttle is boxed and is continuous until the shuttle is driven across the loom by the picker stick. Due to the setting of the resilient bearings, the tendency for the pick ball to swing widely away from the cam surface is substantially eliminated and thus there is eliminated the tendency for the lug on the pick shaft to swing or bank against the loom frame. However, as can be seen from the diagrammatic representation of Figure 8, which indicates the several positions of my pick ball in relation to the driving cam, the pick ball remains out of engagement with the cam surface until the shuttle is boxed before the lifting operation of the cam begins. I am thus able to avoid sudden re-contacting of the pick ball with the cam surface and the tendency to break or dent it. Also, I avoid the frictional resistance present by engagement between the pick ball and the cam surface, except where the cam is actually operating to lift the pick ball and drive the picker.

A further advantage resulting from the use of rubber set bearings of the types shown in Figures 4 and 5 is the elimination of the necessity for lubrication. These parts, particularly the rocker shaft and picker shaft, are subjected to rapid motion and consequent bearing wear, necessitating a very careful lubrication in the event that the ordinary type of bearing is employed. Much difficulty has been incurred in the use of such ordinary metal bearings, due to the presence of gears and belts adjacent the bearings which makes it difficult and dangerous to properly apply lubrication to the bearings. Also, inasmuch as this difficulty is present there is apt to be a tendency on the operator's part to neglect the proper lubrication of the bearings, and as a result the bearings go unlubricated with resultant wear, which tends to induce vibration throughout the loom. Furthermore, the gears and belts bring about a splashing of the lubricant on the fabric being woven by reason of the fact that the attendant while lubricating the bearings is very apt to spill some lubricant on the belts and gears which, when in motion, splash the oil upon the fabric. Also, the bearings themselves when the parts are in operation cause the lubricant to be splashed about either directly onto the fabric or onto the belts and consequently on the fabric being woven.

It has been found in actual practice that in the use of looms employing ordinary metal bearings, as much as twenty-five per cent. of the damaged fabric that it is saleable only as seconds is attributable to oil spots. With the substitution of the proposed resilient bearings this loss is entirely eliminated as the rubber set bearings, according to my invention, makes it possible to eliminate the necessity for such lubrication and avoids waste, soiling and imperfections in the woven fabric.

As the vibrations in my structure are not transmitted to the frame of the loom, the general wear and tear of the various parts is appreciably reduced. In this connection the foregoing illustration and description is not intended to be in any way confining as to the type of loom described nor to looms themselves but rather to textile machinery in general. Nor is it meant to be limited in respect to the various additional rubber bearings which it might be considered advisable to introduce between various working parts of textile machinery in order to reduce the vibration between such parts.

I claim:

1. A loom including a frame, means for weaving fabric including an oscillating member which in its normal operation would tend to impart shocks to the frame, and means for mounting said member on said frame comprising relatively movable parts with resilient means disposed therebetween, said resilient means preventing shocks from being imparted to the frame and affecting the proper spacing in the threads in the fabric, said resilient means also resisting movement from a predetermined position, whereby movement of the oscillating member in a direction against this resistance is opposed and movement in the opposite direction is assisted by the resilient means.

2. A loom including a frame, an oscillating sword and lay for packing weft threads, means for mounting said sword on said frame and comprising spaced relatively movable parts with resilient means disposed therebetween, said resilient means resisting movement from a predetermined central position whereby the motion of the sword near the end of its stroke is opposed by the resilient means and the amount of movement therefore is always the same fixed minimum, so that the weft threads will be evenly spaced.

3. A loom including a frame, an oscillating sword and lay for packing weft threads, crank means for oscillating said sword, means for mounting said sword on said frame and comprising spaced relatively movable parts with resilient means disposed therebetween, said resilient means resisting movement from a predetermined central position whereby the motion imparted to said sword by the crank means near an end of its stroke is opposed by the resilient means and the amount of movement of the sword is therefore always the same fixed minimum, so that the weft threads will be evenly spaced.

4. A loom including a frame, a take-up roll mounted on said frame, a rocker shaft, an oscillating sword mounted thereon which in its normal operation would tend to impart shocks to said frame through said shaft, means mounting said shaft on said frame and including a resilient means which prevents shocks imparted from being transmitted to the take-up roll, said resilient means resisting movement from a predetermined central position whereby the motion of the sword in a direction against this resistance is opposed by the resilient means and the amount of movement therefore is always at the same fixed minimum, so that the weft threads will be evenly spaced.

5. A loom including a frame, a take-up roll, a rocker shaft, an oscillating sword mounted thereon which in its normal operation would tend to impart shocks to said frame through said shaft, means mounting said shaft on said frame and including a resilient means which prevents shocks from being imparted to the take-up roll, and to absorb shocks caused by the movement of other parts of the loom which would normally be transmitted to said sword, said resilient means resisting movement from a predetermined central position whereby the motion of the sword in a direction against this resistance is opposed by the resilient means and the amount of movement therefore is always at the same fixed minimum, so that the weft threads will be evenly spaced.

6. In a loom including a frame, an oscillating sword and lay for packing weft threads, and cranks for driving said lay, means for mounting said sword on said frame comprising a rocker shaft and its bearing so associated that when the loom is stopped the cranks driving the lay will generally assume a position in either side of the top and bottom center, said bearing consisting of two relatively movable parts with resilient means disposed therebetween and operatively connected thereto, whereby said cranks will tend to assume a position near top and bottom and center whereby energy is stored in said resilient means during periods of stoppage of the loom and thereby facilitates the beating up of the weft threads on starting of the machine and prevents spanning of said threads.

7. A loom including a frame, a picker shaft, an oscillating picker mechanism mounted for movement thereby, which in the normal operation thereof would tend to impart shocks to said frame and to means for spacing the weft threads, means for mounting said mechanism comprising spaced relatively movable parts with resilient means disposed therebetween, said resilient means preventing shocks from being imparted to the thread spacing means whereby unevenness in the spacing of the weft threads is avoided.

8. A loom including a frame, a picker shaft, an oscillating picker mechanism mounted for movement thereby, means for mounting said shaft on said frame comprising spaced relatively movable parts with resilient means disposed therebetween, said resilient means resisting movement from a predetermined position whereby the initial motion of the picker mechanism is retarded and whereby deceleration of the shuttle on impact with the picker mechanism in the boxing stage of the operation is retarded and prolonged with consequent lessening of the force of impact of the shuttle against the picker mechanism.

9. In a loom including a frame, a picker shaft, an oscillating picker mechanism mounted for movement thereby and a shuttle reciprocated by impacts with said picker mechanism, means for gradually decelerating the movement of the shuttle near the end of its stroke and lessening the jarring effect of the impact of said shuttle in the boxing stage, said means comprising a mounting for the picker shaft, including relatively movable parts with resilient means disposed therebetween.

10. A loom including a frame, a picker shaft, an oscillating picker mechanism mounted for movement thereby, which in the normal operation thereof would tend to impart shocks to said frame and to means for spacing the weft threads, means for mounting said shaft on said frame comprising spaced relatively movable parts with resilient means disposed therebetween, said resilient means preventing shocks from being imparted to the thread spacing means whereby unevenness in the spacing of the weft threads is avoided, said resilient means also resisting movement from a predetermined position whereby the initial motion of the picker mechanism is retarded and the impact of the shuttle on the picker mechanism in the boxing stage is lessened.

11. In a loom, a frame, a rocker shaft and an oscillatory sword carried thereby, means for mounting said sword on said frame comprising bearings each of which includes a stationary bearing element carried by the frame, a rocker shaft box and bearing element carried thereby and a rubber element disposed between said bearing elements and vulcanized to both, whereby the motion of the sword near the end of its stroke is opposed by the rubber element and the amount of movement thereof is always the same fixed minimum, a picker shaft, means for driving the same, and means located in said driving means and between same and said frame comprising a bearing including a resilient member disposed between and secured to a stationary part of said frame and one of the operative parts of said loom for operating said picker shaft, said resilient member resisting movement from a predetermined position whereby the initial motion of the picker mechanism is retarded.

12. In a loom, a frame, a rocker shaft and an oscillatory sword carried thereby, cranks for driving said sword, means for mounting said sword on said frame comprising bearings each of which includes a stationary bearing element carried by the frame, a rocker shaft box and a bearing element carried thereby and a rubber element disposed between said bearing elements and vulcanized to both, whereby energy is stored in said rubber element when the sword is moved beyond a neutral position thereby facilitating the movement of the sword in the reverse direction, a picker shaft, means for driving the same, a shuttle reciprocated by impacts with a picker mechanism and means located in said driving means comprising a bearing including a resilient member disposed between and secured to a stationary part of said frame and one of the operative parts of said loom for operating said picker shaft, whereby the movement of the shuttle near the end of its stroke is decelerated and the jarring effect of the impact of the shuttle in the boxing stage is lessened.

HARRY H. BURTON.

CERTIFICATE OF CORRECTION.

Patent No. 2,045,978.  June 30, 1936.

HARRY H. BURTON.

It is hereby certified that error appears in the printed specification of the above numbered patent requiring correction as follows: Page 1, second column, line 44, for the word "indicate" read indicated; page 4, first column, line 72-73, claim 4, for "imparted from being transmitted" read from being imparted; and that the said Letters Patent should be read with these corrections therein that the same may conform to the record of the case in the Patent Office.

Signed and sealed this 8th day of September, A. D. 1936.

(Seal)

Leslie Frazer
Acting Commissioner of Patents.